United States Patent
Tziovaras et al.

(10) Patent No.: US 11,311,904 B2
(45) Date of Patent: *Apr. 26, 2022

(54) METHOD FOR THE PARTIAL COLORING OF PLASTIC PARTS

(71) Applicant: Covestro Intellectual Property GmbH & Co. KG, Leverkusen (DE)

(72) Inventors: Georgios Tziovaras, Neuss (DE); Roland Kuenzel, Leverkusen (DE)

(73) Assignee: COVESTRO INTELLECTUAL PROPERTY GMBH & CO. KG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/268,483

(22) PCT Filed: Aug. 22, 2019

(86) PCT No.: PCT/EP2019/072431
§ 371 (c)(1),
(2) Date: Feb. 15, 2021

(87) PCT Pub. No.: WO2020/039018
PCT Pub. Date: Feb. 27, 2020

(65) Prior Publication Data
US 2021/0170441 A1    Jun. 10, 2021

(30) Foreign Application Priority Data
Aug. 23, 2018 (EP) ..................................... 18190363

(51) Int. Cl.
*B05D 3/10* (2006.01)
*B05D 5/06* (2006.01)
(Continued)

(52) U.S. Cl.
CPC .................. *B05D 1/18* (2013.01); *B05D 3/06* (2013.01); *B05D 3/107* (2013.01); *B05D 5/06* (2013.01);
(Continued)

(58) Field of Classification Search
CPC . B05D 1/18; B05D 3/06; B05D 3/107; B05D 5/06; C08K 3/04; B42D 25/36; B42D 25/41; C08L 101/00; B41M 5/267
See application file for complete search history.

(56) References Cited

U.S. PATENT DOCUMENTS

| | | | |
|---|---|---|---|
| 3,692,744 A | 9/1972 | Rene et al. | |
| 4,086,212 A | 4/1978 | Bier et al. | |

(Continued)

FOREIGN PATENT DOCUMENTS

| | | |
|---|---|---|
| DE | 3832396 A1 | 2/1990 |
| EP | 2050866 A2 | 4/2009 |

(Continued)

OTHER PUBLICATIONS

Kunststoff-Handbuch, vol. VIII, p. 695 ff, Kar-Hanser-Verlag, Munich 1973.

(Continued)

*Primary Examiner* — Bijan Ahvazi
(74) *Attorney, Agent, or Firm* — Jed C. Benson

(57) ABSTRACT

The invention relates to an improved method for the partial coloring, in particular for the color laser engraving, of plastic parts, in particular thermoplastic plastic parts, more particularly thermoplastic plastic parts that have a multi-layered structure, to the resulting partially colored, preferably color laser engraved, plastic parts, in particular thermoplastic plastic parts, and to a device for the partial coloring of plastic parts.

11 Claims, 1 Drawing Sheet

(51) Int. Cl.
 B42D 25/36 (2014.01)
 B42D 25/41 (2014.01)
 B05D 1/18 (2006.01)
 B05D 3/06 (2006.01)
 C08K 3/04 (2006.01)
 C08L 101/00 (2006.01)
 B41M 5/26 (2006.01)

(52) U.S. Cl.
 CPC ............. *B42D 25/36* (2014.10); *B42D 25/41* (2014.10); *C08K 3/04* (2013.01); *C08L 101/00* (2013.01); *B05D 2201/02* (2013.01); *B41M 5/267* (2013.01)

(56) References Cited

U.S. PATENT DOCUMENTS

| | | | |
|---|---|---|---|
| 4,107,149 | A | 8/1978 | Bier et al. |
| 4,176,224 | A | 11/1979 | Bier et al. |
| 4,368,240 | A | 1/1983 | Nauta et al. |
| 4,770,541 | A * | 9/1988 | Fedter .................. G01J 5/20 250/352 |
| 4,982,014 | A | 1/1991 | Freitag et al. |
| 5,733,651 | A | 3/1998 | Wank et al. |
| 6,464,733 | B2 * | 10/2002 | Ryser .................... D06P 5/2011 8/444 |
| 6,733,543 | B2 | 5/2004 | Pyles et al. |
| 6,749,646 | B2 | 6/2004 | Pyles et al. |
| 6,994,735 | B2 * | 2/2006 | Pyles .................. D06P 1/65118 8/609 |
| 7,674,845 | B2 | 3/2010 | Van et al. |
| 7,771,646 | B2 | 8/2010 | Clauss et al. |
| 7,793,846 | B2 | 9/2010 | Jones |
| 8,980,135 | B2 | 3/2015 | Takeda et al. |
| 10,131,178 | B2 | 11/2018 | Pudleiner et al. |
| 10,662,581 | B2 * | 5/2020 | Tziovaras ............. B32B 27/325 |
| 2009/0089942 | A1 * | 4/2009 | Pyles .................... D06P 1/0004 8/515 |
| 2017/0247289 | A1 * | 8/2017 | Waldschmidt ......... B23K 26/57 |

FOREIGN PATENT DOCUMENTS

| | | |
|---|---|---|
| EP | 2752302 A2 | 7/2014 |
| GB | 1229482 A | 4/1971 |
| JP | 2008214596 A | 9/2008 |
| JP | 2012011688 A | 1/2012 |
| WO | 0014325 A1 | 3/2000 |
| WO | 2015193013 A1 | 12/2015 |
| WO | 2017167651 A1 | 10/2017 |
| WO | 2019002118 A1 | 1/2019 |

OTHER PUBLICATIONS

D. Freitag, U. Grigo, P. R. Müller, H. Nouvertné, Bayer AG, "Polycarbonates" in Encyclopedia of Polymer Science and Engineering, vol. 11, second edition, 1988, pp. 648-718.

U. Grigo, K. Kirchner and P. R. Müller, "Polycarbonate" in Becker/Braun, Kunststoff-Handbuch, vol. 3/1, Polycarbonate, Polyacetale, Polyester, Celluloseester, Carl Hanser Verlag Munich, Vienna 1992, pp. 117-299.

H. Schnell, Chemistry and Physics of Polycarbonates, Interscience Publishers, New York 1964, p. 28 ff.; p. 102 ff.

D. G. Legrand, J.T. Bendler, Handbook of Polycarbonate Science and Technology, Marcel Dekker New York 2000, p. 72 ff.

Adachi et al., J. Am. Ceram. Soc. 2008, 91, 2897-2902.

Adachi et al. J. Am. Ceram. Soc. 2007, 90 4059-4061.

International Search Report, PCT/EP2019/072431, dated Jan. 13, 2020, Authorized officer: Reinhold Seiler.

* cited by examiner

METHOD FOR THE PARTIAL COLORING OF PLASTIC PARTS

CROSS-REFERENCE TO RELATED APPLICATION

This application is a national stage application under 35 U.S.C. § 371 of PCT/EP2019/072431, filed Aug. 22, 2019, which claims the benefit of European Application No. 18190363.4, filed Aug. 23, 2018, each of which is incorporated herein by reference.

FIELD

The present invention relates to an improved process for partial coloring, in particular for color laser engraving, of plastic parts, in particular thermoplastic plastic parts, very particularly thermoplastic plastic parts comprising a layer construction, to the resulting partially colored, preferably color laser engraved, plastic parts, in particular thermoplastic plastic parts, and to an apparatus for partial coloring of plastic parts.

BACKGROUND

The option of color laser engraving plastic parts is of interest for the entire plastic parts manufacturing industry. Of interest here is color laser engraving of three-dimensionally formed plastic parts, for example for the automotive industry. Thus for example switches, trim pieces etc. may be engraved with colored symbols. Plastic parts comprising a lacquer for surface protection thereof may also be color laser engraved. The laser beam removes the lacquer layer and the dye simultaneously migrates into the plastic surface at this site. Unprotected plastic surfaces may also be color laser engraved and subsequently lacquered to ensure an uninterrupted shiny appearance of the plastic parts and provide protection against scratches and chemical damage. Such colored symbols have hitherto been producible for example by plastic injection molding with a plurality of colored components in the first manufacturing step. In a second manufacturing step the plastic parts must be lacquered with a covering ink. In a third manufacturing step the color layer must be laser engraved to reveal the plastic surface there below. A protective lacquer may optionally be applied in a fourth manufacturing step.

Alternatively, transparent plastic films may be color engraved on their reverse and subsequently subjected to film insert molding with a thermoplastic to obtain surfaces which are shiny or have a uniform appearance. This process is disclosed for example in EP-A 0691201 example 1.

In the security and/or high-value document industry, in particular identification documents (ID documents), there is the need for colored personalization of these documents by means of lasers. The personalization of ID documents consisting partially or completely of polymer films by laser engraving is prior art. However, the laser engraving processes known hitherto generate only images and texts in various shades of gray in ID documents. Colored elements cannot be generated by laser engraving. Only in combination with color layers previously applied by printing techniques which are subsequently altered by means of lasers is it possible to generate colored images in or on such plastic parts and/or ID documents.

Recent years have seen the development, especially in the field of security and/or high-value documents, in particular ID documents, of processes that make it possible to generate colored elements in these documents that are entirely or partially constructed from polymer films. These processes are described, for example, in WO-A 03/056507, EP-A 2752302 or JP-A 2012-011688, but are associated with considerable technical complexity. All processes include a printing process to realize the coloring.

WO-A 2017/167651 discloses a process for partial coloring, in particular for color laser engraving, of plastic parts, in particular thermoplastic plastic parts, very particularly plastic films.

Unpublished patent application LU-A100327 discloses an improved process for partial coloring, in particular for color laser engraving, of plastic parts, in particular thermoplastic plastic parts, very particularly plastic films. In the process according to LU-A100327 the plastic parts comprise additives which exhibit an absorption maximum in the wavelength range of the employed focused nonionic electromagnetic radiation or the plastic part is coated with an additive in the form of a coating composition.

However, both processes have disadvantages of intensity, sharpness and positional accuracy of the resulting partial coloring, in particular the resulting color laser engraving.

SUMMARY

The present invention accordingly has for its object to provide an improved process for partial coloring, in particular for color laser engraving, of plastic parts, preferably of thermoplastic plastic parts, very particularly of thermoplastic plastic parts comprising a layer construction, for example plastic films and/or film layer composites to achieve a partial coloring, in particular color laser engraving, exhibiting high positional accuracy, sharpness and uniformity of intensity.

BRIEF DESCRIPTION OF THE DRAWINGS

Various features and characteristics of the inventions described in this specification may be better understood by reference to the accompanying figures, in which.

DETAILED DESCRIPTION

Figure 1:
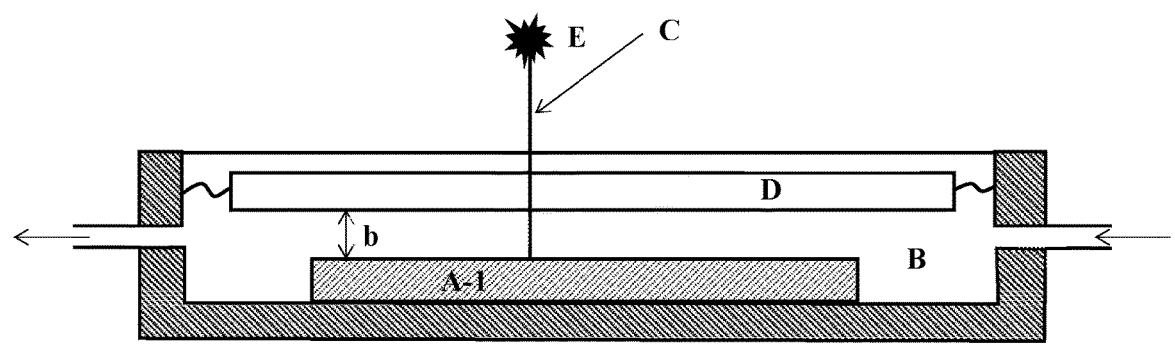
FIG. 1 shows a possible embodiment of the apparatus according to the invention for the partial coloring of two-dimensional plastic parts.

This object was surprisingly achieved by the process according to the invention for partial coloring, in particular color laser engraving, of plastic parts, preferably of thermoplastic plastic parts, very particularly preferably of thermoplastic plastic parts comprising a layer construction, comprising the steps of:

i) immersing a plastic part (A) in a coloring bath (B),
ii) irradiating the plastic part (A) from i) with focused nonionizing electromagnetic radiation (C), wherein the partial coloring takes place essentially only at the areas irradiated in step ii), wherein the wavelength range of the focused non-ionizing electromagnetic radiation (C) is selected such that the coloring bath (B) has a radiation permeability of ≥0.1% to ≤99%, preferably of ≥0.5% to ≤99%, more preferably ≥0.9% to ≤99%, more preferably of ≥2% to ≤99%, more preferably of ≥30% to ≤95%, particularly preferably of ≥40% to ≤93%, for the selected radiation, determined according to the UV-VIS-NIR-MIR method according to DIN EN ISO/IEC 17025, characterized in that
the coloring bath (B) has a temperature of ≤99° C. to ≥−60° C., preferably of ≤99° C. to ≥0° C., more preferably of ≤70° C. to ≥10° C., particularly preferably of ≤50° C. to ≥15° C., wherein the temperature of the coloring bath (B) preferably has a constant temperature over the duration of the process, and that the focused nonionizing electromagnetic radiation (C) passes through a sheet (D) comprising one or more radiation-decoupling materials before impacting the plastic part (A).

In the context of the present invention "substantially" is to be understood as meaning that a colored element which is clearly apparent to the naked eye as a visible colored element is formed only at the sites irradiated in step ii).

Immersing in step i) is to be understood as meaning at least partial wetting of the surface of the plastic part (A) with the coloring bath (B) containing at least one colorant. The immersing in step i) may also be carried out by alternative wetting of the surface of the plastic part (A) with a coloring layer b).

In the context of the present invention "constant temperature of the coloring bath (B)" is to be understood as meaning that the temperature of the coloring bath may deviate upward or downward from the chosen temperature of the coloring bath (B) by not more than 10° C., preferably by not more than 8° C., particularly preferably by not more than 5° C., over the duration of the process.

The coloring bath (B) may alternatively undergo a variation in temperature of more than 10° C., preferably up to 20° C., more preferably up to 50° C., particularly preferably up to 100° C., over the duration of the process.

The process according to the invention and preferably also the alternative process recited herein below each have the feature that the partial coloring of the plastic part, in particular the thermoplastic plastic part, very particularly the thermoplastic plastic part comprising a layer construction, substantially at the sites at least partially wetted in step i') of the alternative process described herein below or irradiated in step ii) is effected with an improved intensity and improved sharpness of the coloring. The remainder of the plastic part (A) exhibits only very weak coloring, if any, at the nonirradiated regions. It is thus possible to color specific regions of the plastic part in order to apply to this plastic part by the process according to the invention for example an image, personalization, logo, symbol or script. These are not readily removable from the plastic surface. The process according to the invention is thus suitable in particular for the field of producing security and identification documents.

Especially upon irradiation with laser radiation these colored elements achieve particularly high resolutions of 5000 dpi and in some cases even higher. The process according to the invention requires neither a high-precision printing technique nor the use of different laser strengths, for example lasers emitting at different wavelengths, provided the irradiation in step ii) is carried out with laser radiation. In addition the process according to the invention, and preferably also the alternative process according to the invention, as described further below, is suitable for the application of colored elements both onto two- and/or three-dimensional plastic parts (A) and onto thermoplastic plastic parts (A) comprising a layer construction containing one or more layers of a thermoplastic plastic.

Highly focused laser systems can produce uninterrupted colored lines, a feature of security printing, in a width of 10 μm. This is not possible with any of the printing processes available today.

The sheet (D) may be placed in the coloring bath (B) so as to ensure a constant distance between the surface of the plastic part (A) and sheet (D) over the duration of the entire process. This distance between the surface of the plastic part (A) and sheet (D) is also known as the immersion depth. In the region of the immersion depth the focused nonionizing electromagnetic radiation (C) penetrates the coloring bath (B) before it impacts the surface of (A).

The immersion depth may be precisely adjusted over the entire process and may thus also be kept constant over the duration of the entire process to achieve a partial coloring of high intensity and sharpness. In one embodiment the immersion depth may be ≤120 mm, preferably ≥0.01 to ≤100 mm, particularly preferably ≥0.1 to ≤20 mm and very particularly preferably ≥0.1 to ≤5.0 mm.

In the case of two-dimensional plastic parts (A), in particular thermoplastic plastic parts comprising a layer construction containing one or more layers of a thermoplastic plastic, a preferably flat sheet (D) may be employed. The sheet (D) is preferably arranged parallel to the surface of (A). In another embodiment for laser engraving of two-dimensional plastic parts (A) a sheet (D) having the size of the partial coloring of the plastic part to be achieved may be employed in the process according to the invention.

In the case of three-dimensional plastic parts (A) a correspondingly three-dimensional sheet (D) may be used to achieve a constant immersion depth. It is preferable to employ a sheet (D) having the size of the partial coloring in the plastic part (A) to be achieved. This makes it possible to reduce the shape complexity of the sheet (D). The sheet (D) is preferably arranged parallel to the tangent of the three-dimensional shape (A) that is to be inscribed in color.

In a preferred embodiment of the process according to the invention (C) is incident perpendicular to the sheet (D).

In the process according to the invention the focused nonionizing electromagnetic beam (C), preferably laser beam, penetrates the sheet (D) comprising one or more radiation-decoupling materials. In order to minimize the loss of intensity of (C) and also the scattering of (C) on the sheet (D) the radiation-decoupling material of the sheet (D) is preferably selected from those having a high surface quality and radiation permeability. Radiation-decoupling materials of the sheet (D) may exhibit a scratch-dig value determined according to ISO 10110-8 of ≥80-50 to ≤10-10, preferably of ≥60-40 to ≤20-10, a surface roughness Rq determined according to ISO 10110-8 of ≥0.5 to ≤500 nm, preferably of ≥0.7 to ≤100 nm, particularly preferably of ≥1 nm to ≤10 nm, and a radiation permeability for the selected radiation determined by the UV-VIS-NIR-MIR method according to DIN EN ISO/IEC 17025 of ≥50% to ≤99.95%, preferably of ≥60% to ≤99.9%, particularly preferably of ≥70% to ≤99.89%.

In one embodiment one or more radiation-decoupling materials of the sheet (D) may contain at least one or more compounds from the group of glass, for example non-oxidic glasses, in particular halide glasses or chalcogenide glasses, oxidic glasses, in particular phosphate-containing glasses, silicate-containing glasses, borate glasses, aluminosilicate glasses, lead silicate glasses, alkali metal silicate glasses, borosilicate glasses, alkali metal borate glasses, alkali metal-alkaline earth metal silicate glass, quartz glass, organic glasses, radiation-permeable plastic, mineral glass, synthetic glass, radiation-permeable ceramic material (for example Perlucor™ from CeramTec GmbH or fine-crystalline spinel ceramics from Fraunhofer Institut für Keramische Technologien und Systeme IKTS or Robax™ radiation-permeable glass ceramic from Schott AG) and/or mixtures of at least two of the abovementioned compounds. Preferably glass, radiation-permeable plastic and/or synthetic glass.

The coloring bath (B) has a temperature of ≤99° C. to ≥−60° C., preferably from ≤99° C. to ≥0° C., preferably from ≤70° C. to ≥10° C., very particularly preferably from ≤50° C. to ≥15° C., and has a constant temperature over the duration of the process. In a preferred embodiment of the invention the temperature of the coloring bath (B) between the surface of the plastic part (A) and the sheet (D) has a constant temperature over the duration of the process.

The temperature of the coloring bath (B) may alternatively be varied over the duration of the process in a temperature range from 0° C. 100° C., preferably from 5° C. to 80° C., more preferably from 10° C. to 60° C., yet more preferably from 15° C. to 40° C., particularly preferably from 20° C. to 30° C.

In a further embodiment the temperature of the coloring bath (B), in particular the temperature of the coloring bath (B) between the surface of the plastic part (A) and the sheet (D), may be kept constant by appropriate temperature control apparatuses, in particular cooling apparatuses.

In another embodiment the coloring bath (B) may be continuously passed through the slot between the surface of the plastic part (A) and the sheet (D), thus ensuring that no heat buildup occurs between the surface of (A) and (D) and keeping the temperature constant between the surface of (A) and (D) in the chosen temperature range.

The process according to the invention may employ a multiplicity of plastic parts (A), in particular thermoplastic plastic parts, very particularly thermoplastic plastic parts comprising a layer construction. The preferably thermoplastic plastic parts, very particularly thermoplastic plastic parts comprising a layer construction, may particularly preferably be a thermoplastic plastic selected from polymers of ethylenically unsaturated monomers and/or polycondensates of bifunctional reactive compounds and/or polyaddition products of bifunctional reactive compounds. For certain applications, for example in the field of identification documents, it may be advantageous and hence preferred to use a transparent thermoplastic plastic, preferably in the form of plastic films.

Particularly suitable thermoplastic plastics are one or more polycarbonate(s) or copolycarbonate(s) based on diphenols, poly- or copolyacrylate(s) and poly- or copolymethacrylate(s) such as, by way of example and preferably, polymethylmethacrylate or poly(meth)acrylate (PMMA), polymer(s) or copolymer(s) with styrene such as, by way of example and preferably, polystyrene (PS), acrylonitrile-butadiene-styrene (ABS), or polystyrene-acrylonitrile (SAN), thermoplastic polyurethane(s) and also polyolefin(s) such as, by way of example and preferably, polypropylene types or polyolefins based on cyclic olefins (e.g. TOPAS®, Hoechst), poly- or copolycondensate(s) of terephthalic acid such as, by way of example and preferably, poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), polyamide (PA), poly- or copolycondensate(s) of naphthalenedicarboxylic acid such as, by way of example and preferably, polyethylene glycol naphthalate (PEN), poly- or copolycondensate(s) of at least one cycloalkyldicarboxylic acid such as, by way of example and preferably, polycyclohexanedimethanolcyclohexanedicarboxylic acid (PCCD), polysulfones (PSU), mixtures of at least two of the aforementioned or blends thereof.

Particularly preferred thermoplastic plastics are one or more polycarbonate(s) or copolycarbonate(s) based on diphenols or blends comprising at least one polycarbonate or copolycarbonate. Very particular preference is given to blends containing at least one polycarbonate or copolycarbonate and at least one poly- or copolycondensate of terephthalic acid, of naphthalenedicarboxylic acid or of a cycloalkyldicarboxylic acid, preferably of cyclohexanedicarboxylic acid. Very particular preference is given to polycarbonates or copolycarbonates, especially having average molecular weights Mw of 500 to 100 000, preferably of 10 000 to 80 000, particularly preferably of 15 000 to 40 000, or blends thereof with at least one poly- or copolycondensate of terephthalic acid having average molecular weights Mw of 10 000 to 200 000, preferably of 21 000 to 120 000.

Suitable poly- or copolycondensates of terephthalic acid in preferred embodiments of the invention are polyalkylene terephthalates. Suitable polyalkylene terephthalates are for example reaction products of aromatic dicarboxylic acids or their reactive derivatives (for example dimethyl esters or anhydrides) and aliphatic, cycloaliphatic or araliphatic diols and mixtures of these reaction products.

Preferred polyalkylene terephthalates may be prepared from terephthalic acid (or reactive derivatives thereof) and aliphatic or cycloaliphatic diols having 2 to 10 C atoms by known methods (Kunststoff-Handbuch, vol. VIII, p. 695 ff, Karl-Hanser-Verlag, Munich 1973).

Preferred polyalkylene terephthalates contain at least 80 mol %, preferably 90 mol %, of terephthalic acid radicals, based on the dicarboxylic acid component, and at least 80 mol %, preferably at least 90 mol %, of ethylene glycol and/or butane-1,4-diol and/or cyclohexane-1,4-dimethanol radicals based on the diol component.

The preferred polyalkylene terephthalates may contain, in addition to terephthalic acid radicals, up to 20 mol % of radicals of other aromatic dicarboxylic acids having 8 to 14 carbon atoms or of aliphatic dicarboxylic acids having 4 to 12 carbon atoms, such as for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene and/or butane-1,4-diol glycol radicals, up to 80 mol % of other aliphatic diols having 3 to 12 carbon atoms or of cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di([beta]-hydroxyethoxy)benzene, 2,2-bis(4-hydroxycyclohexyl)propane, 2,4-dihydroxy-1,1,3,3-tetramethylcyclobutane, 2,2-bis(3-[beta]-hydroxyethoxyphenyl)propane and 2,2-bis(4-hydroxypropoxyphenyl)propane (cf. DE-OS 24 07 674, 24 07 776, 27 15 932).

The polyalkylene terephthalates may be branched by incorporation of relatively small amounts of tri- or tetrahydric alcohols or tri- or tetrabasic carboxylic acids, as described for example in DE-OS 19 00 270 and US-PS 3 692 744. Examples of preferred branching agents are trimesic acid, trimellitic acid, trimethylolethane and trimethylolpropane and pentaerythritol.

It is preferable when not more than 1 mol % of the branching agent is used, based on the acid component.

Particular preference is given to polyalkylene terephthalates which have been prepared solely from terephthalic acid and the reactive derivatives thereof (e.g. the dialkyl esters thereof) and ethylene glycol and/or butane-1,4-diol and/or cyclohexane-1,4-dimethanol radicals, and to mixtures of these polyalkylene terephthalates.

Preferred polyalkylene terephthalates are also copolyesters prepared from at least two of the abovementioned acid components and/or from at least two of the abovementioned alcohol components; particularly preferred copolyesters are poly(ethylene glycol/butane-1,4-diol) terephthalates.

The polyalkylene terephthalates preferably used as a component preferably have an intrinsic viscosity of about 0.4 to 1.5 dl/g, preferably 0.5 to 1.3 dl/g, in each case measured in phenol/o-dichlorobenzene (1:1 parts by weight) at 25° C.

In particularly preferred embodiments of the invention the blend of at least one polycarbonate or copolycarbonate with at least one poly- or copolycondensate of terephthalic acid is a blend of at least one polycarbonate or copolycarbonate with poly- or copolybutylene terephthalate or glycol-modified poly- or copolycyclohexanedimethylene terephthalate. Such a blend of polycarbonate or copolycarbonate with poly- or copolybutylene terephthalate or glycol-modified poly- or copolycyclohexanedimethylene terephthalate may preferably be one comprising 1% to 90% by weight of polycarbonate or copolycarbonate and 99% to 10% by weight of poly- or copolybutylene terephthalate or glycol-modified poly- or copolycyclohexanedimethylene terephthalate, preferably comprising 1% to 90% by weight of polycarbonate and 99% to 10% by weight of polybutylene terephthalate or glycol-modified polycyclohexanedimethylene terephthalate, wherein the proportions sum to 100% by weight. Such a blend of polycarbonate or copolycarbonate with poly- or copolybutylene terephthalate or glycol-modified poly- or copolycyclohexanedimethylene terephthalate may particularly preferably be one comprising 20% to 85% by weight of polycarbonate or copolycarbonate and 80% to 15% by weight of poly- or copolybutylene terephthalate or glycol-modified poly- or copolycyclohexanedimethylene terephthalate, preferably comprising 20% to 85% by weight of polycarbonate and 80% to 15% by weight of polybutylene terephthalate or glycol-modified polycyclohexanedimethylene terephthalate, wherein the proportions sum to 100% by weight. Such a blend of polycarbonate or copolycarbonate with poly- or copolybutylene terephthalate or glycol-modified poly- or copolycyclohexanedimethylene terephthalate may very particularly preferably be one comprising 35% to 80% by weight of polycarbonate or copolycarbonate and 65% to 20% by weight of poly- or copolybutylene terephthalate or glycol-modified poly- or copolycyclohexanedimethylene terephthalate, preferably comprising 35% to 80% by weight of polycarbonate and 65% to 20% by weight of polybutylene terephthalate or glycol-modified polycyclohexanedimethylene terephthalate, wherein the proportions sum to 100% by weight. In very particularly preferred embodiments blends of polycarbonate and glycol-modified polycyclohexanedimethylene terephthalate may be concerned in the compositions mentioned above.

Suitable polycarbonates or copolycarbonates in preferred embodiments are particularly aromatic polycarbonates or copolycarbonates.

The polycarbonates or copolycarbonates may be linear or branched in known fashion.

These polycarbonates may be produced in known fashion from diphenols, carbonic acid derivatives, optionally chain terminators and optionally branching agents. Particulars pertaining to the production of polycarbonates are disclosed in many patent documents spanning approximately the last 40 years. Reference is made here merely by way of example to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, volume 11, second edition, 1988, pages 648-718 and finally to Dres. U. Grigo, K. Kirchner and P. R. Müller, "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols may include for example dihydroxyaryl compounds of general formula (I),

HO—Z—OH (I)

wherein Z is an aromatic radical having 6 to 34 carbon atoms which may contain one or more optionally substituted aromatic rings and aliphatic or cycloaliphatic radicals or alkylaryls or heteroatoms as bridging members.

Examples of suitable dihydroxyaryl compounds include: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 ff.; p. 102 ff., and in D. G. Legrand, J. T. Bendler, Handbook of Polycarbonate Science and Technology, Marcel Dekker New York 2000, p. 72 ff.

Preferred dihydroxyaryl compounds are, for example, resorcinol, 4,4'-dihydroxydiphenyl, bis(4-hydroxyphenyl) methane, bis(3,5-dimethyl-4-hydroxyphenyl)methane, bis (4-hydroxyphenyl)diphenylmethane, 1,1-bis(4-hydroxyphenyl)-1-phenylethane, 1,1-bis(4-hydroxyphenyl)-1-(1-naphthyl)ethane, 1,1-bis(4-hydroxyphenyl)-1-(2-naphthyl) ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)-1-phenylpropane, 2,2-bis(4-hydroxyphenyl) hexafluoropropane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane, 1,1-bis(3,5-dimethyl-4-hydroxyphenyl)cyclohexane, 1,1-bis(4-hydroxyphenyl)-4-methylcyclohexane, 1,3-bis[2-(4-hydroxyphenyl)-2-propyl]benzene, 1,1'-bis(4-hydroxyphenyl)-3-diisopropylbenzene, 1,1'-bis(4-hydroxyphenyl)-4-diisopropylbenzene, 1,3-bis[2-(3,5-dimethyl-4-hydroxyphenyl)-2-propyl]benzene, bis(4-hydroxyphenyl) ether, bis(4-hydroxyphenyl) sulfide, bis(4-hydroxyphenyl) sulfone, bis(3,5-dimethyl-4-hydroxyphenyl) sulfone and 2,2',3,3'-tetrahydro-3,3,3',3'-tetramethyl-1,1'-spirobi[1H-indene]-5,5'-diol or dihydroxydiphenylcycloalkanes of the formula (Ia)

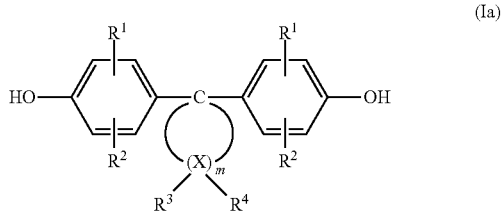

(Ia)

wherein
R¹ and R² independently of one another represent hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl,
m is an integer from 4 to 7, preferably 4 or 5,
R³ and R⁴ individually choosable for each X independently of one another represent hydrogen or $C_1$-$C_6$-alkyl and
X represents carbon,
with the proviso that for at least one atom X, R³ and R⁴ both represent alkyl. It is preferable when in formula (Ia) for one or two atom(s) X, especially only for one atom X, R³ and R⁴ both represent alkyl.

A preferred alkyl radical for the radicals R³ and R⁴ in formula (Ia) is methyl. The X atoms alpha to the diphenyl-substituted carbon atom (C-1) are preferably not dialkyl-substituted but the alkyl disubstitution beta to C-1 is preferred.

Particularly preferred dihydroxydiphenylcycloalkanes of formula (Ia) are those having 5 and 6 ring carbon atoms X in the cycloaliphatic radical (m=4 or 5 in formula (Ia)), for example the diphenols of formulae (Ia-1) to (Ia-3),

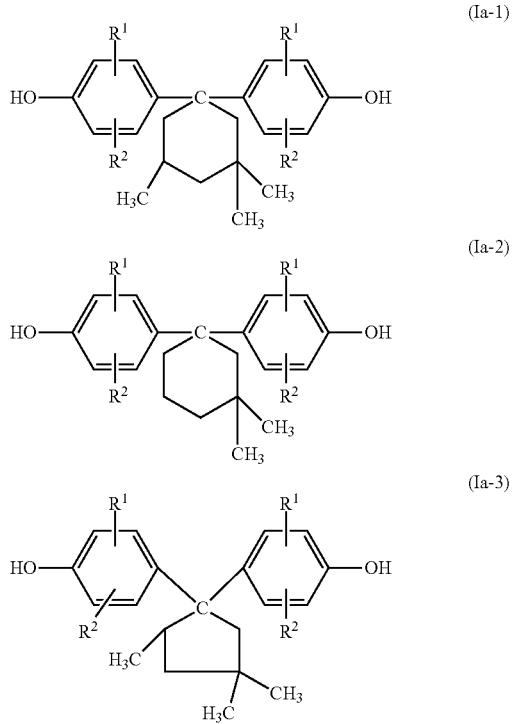

A very particularly preferred dihydroxydiphenylcycloalkane of the formula (Ia) is 1,1-bis(4-hydroxyphenyl)-3,3,5-trimethylcyclohexane (formula (Ia-1) with R¹ and R²=H).

Such polycarbonates may be produced from dihydroxydiphenylcycloalkanes of formula (Ia) according to EP-A 359 953.

Particularly preferred dihydroxyaryl compounds are resorcinol, 4,4'-dihydroxydiphenyl, bis(4-hydroxyphenyl) diphenylmethane, 1,1-bis(4-hydroxyphenyl)-1-phenylethane, bis(4-hydroxyphenyl)-1-(1-naphthyl)ethane, bis(4-hydroxyphenyl)-1-(2-naphthyl)ethane, 2,2-bis(4-hydroxyphenyl)propane, 2,2-bis(3,5-dimethyl-4-hydroxyphenyl)propane, 1,1-bis(4-hydroxyphenyl) cyclohexane, 1,1-bis(3,5-dimethyl-4-hydroxyphenyl) cyclohexane, 1,1-bis(4-hydroxyphenyl)-3,3,5-trimethylcyclohexane, 1,1'-bis(4-hydroxyphenyl)-3-diisopropylbenzene and 1,1'-bis(4-hydroxyphenyl)-4-diisopropylbenzene.

Very particularly preferred dihydroxyaryl compounds are 4,4'-dihydroxydiphenyl and 2,2-bis(4-hydroxyphenyl) propane.

It is possible to use either one dihydroxyaryl compound to form homopolycarbonates or different dihydroxyaryl compounds to form copolycarbonates. It is possible to use either one dihydroxyaryl compound of formula (I) or (Ia) to form homopolycarbonates or two or more dihydroxyaryl compounds of formula(e) (I) and/or (Ia) to form copolycarbonates. The various dihydroxyaryl compounds may be interconnected in random or blockwise fashion. In the case of copolycarbonates composed of dihydroxyaryl compounds of formulae (I) and (Ia) the molar ratio of dihydroxyaryl compounds of formula (Ia) to the optionally co-usable other dihydroxyaryl compounds of formula (I) is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I), and especially between 99 mol % of (Ia) to 1 mol % of (I) and 30 mol % of (Ia) to 70 mol % of (I).

A very particularly preferred copolycarbonate may be produced using 1,1-bis(4-hydroxyphenyl)-3,3,5-trimethylcyclohexane and 2,2-bis(4-hydroxyphenyl)propane dihydroxyaryl compounds of formulae (Ia) and (I).

Suitable carbonic acid derivatives may be for example diaryl carbonates of general formula (II),

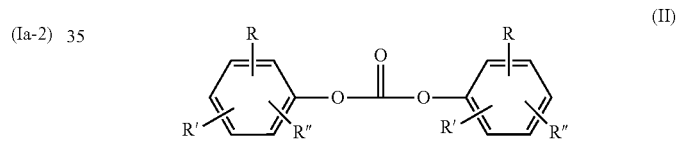

wherein
R, R' and R" are independently of one another identical or different and represent hydrogen, linear or branched $C_1$-$C_{34}$-alkyl, $C_7$-$C_{34}$-alkylaryl or $C_6$-$C_{34}$-aryl, R may additionally also represent —COO—R''', wherein R''' represents hydrogen, linear or branched $C_1$-$C_{34}$-alkyl, $C_7$-$C_{34}$-alkylaryl or $C_6$-$C_{34}$-aryl.

Preferred diaryl carbonates are for example diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4 isooctylphenyl phenyl carbonate, di(4-isooctylphenyl) carbonate, 4-n-nonylphenyl phenyl carbonate, di(4-n-nonylphenyl) carbonate, 4-cyclohexylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl] carbonate, biphenyl-4-yl phenyl carbonate, di(biphenyl-4-yl) carbonate, 4-(1-naphthyl)phenyl phenyl carbonate, 4-(2-naphthyl) phenyl phenyl carbonate, di[4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, (methyl salicylate) phenyl carbonate, di(methyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, diphenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl) phenyl phenyl carbonate, di[4-(1-methyl-1-phenylethyl) phenyl] carbonate and di(methyl salicylate) carbonate. Diphenyl carbonate is very particularly preferred.

It is possible to use either one diaryl carbonate or different diaryl carbonates.

To control or alter the end groups it is also possible to employ for example one or more monohydroxyaryl compound(s) not used to produce the used diaryl carbonate(s) as chain terminators. These may be those of general formula (III),

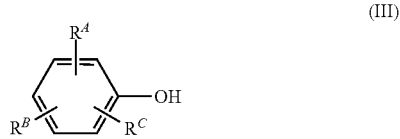

(III)

wherein
$R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl and
$R^B$, $R^C$ are independently of one another identical or different and represent hydrogen, linear or branched $C_1$-$C_{34}$-alkyl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol, 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

Preference is given to 4-tert-butylphenol, 4-isooctylphenol and 3-pentadecylphenol.

Suitable branching agents include compounds having three or more functional groups, preferably those having three or more hydroxyl groups.

Suitable compounds having three or more phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol and tetra(4-hydroxyphenyl)methane.

Other suitable compounds having three or more functional groups are, for example, 2,4-dihydroxybenzoic acid, trimesic acid/trimesoyl trichloride, cyanuric trichloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The plastic part containing the abovementioned thermoplastic polymers may be extruded, coextruded, cast, three-dimensionally printed and/or injection molded. The plastic part may also be a three-dimensional plastic part. It is likewise possible that the plastic part may also be selected from plastic parts comprising a layer construction such as for example films, film layer composites and/or sheets as well as combinations thereof, such as films that have been subjected to film insert molding and contain the polymers described hereinabove. The plastic part is particularly preferably a film, film layer composite and/or a sheet containing the abovementioned polymers produced by extrusion and/or coextrusion.

In one embodiment the plastic part (A), in particular thermoplastic plastic part, very particularly thermoplastic plastic part comprising a layer construction, comprises at least one additive which has an absorption maximum in the wavelength range of the employed focused nonionizing electromagnetic radiation or (A) is coated with at least one additive in the form of a coating composition which has an absorption maximum in the wavelength range of the employed focused nonionizing electromagnetic radiation.

Suitable additives include in principle all laser-sensitive additives, so-called laser marking additives, i.e. additives composed of an absorber in the wavelength range of the radiation (C) to be used. The additive preferably comprises at least one or more organic and/or inorganic IR absorbers, preferably inorganic IR absorbers. Such additives and the use thereof in molding compounds are described for example in WO-A 2004/50766 and WO-A 2004/50767 and are commercially available from DSM under the brand name Micabs™.

Suitable organic IR absorbers are for example compounds having the highest possible absorption between 700 and 2500 nm (near-infrared=NIR). Suitable infrared absorbers include for example those known from the literature as described by substance class for example in M. Matsuoka, Infrared Absorbing Dyes, Plenum Press, New York, 1990. Particularly suitable are infrared absorbers from the substance classes comprising the azo, azomethine, methine, anthraquinone, indanthrone, pyranthrone, flavanthrone, benzanthrone, phthalocyanine, perylene, dioxazine, thioindigo, isoindoline, isoindolinone, quinacridone, pyrrolopyrrole or quinophthalone pigments as well as metal complexes of azo, azomethine or methine dyes or metal salts of azo compounds. Among these, phthalocyanines and naphthalocyanines are very particularly suitable. On account of their improved solubility in thermoplastic plastics phthalocyanines and naphthalocyanines having bulky side groups are preferable.

Suitable inorganic IR absorbers are for example mixed oxides of metals such as for example phosphorus-containing tin-copper mixed oxides, as described in WO-A 2006/042714 for example, those from the group of borides and/or tungstates and mixtures thereof, preferably at least one or more IR absorbers from the group of borides and/or tungstates and mixtures thereof, particularly preferably at least one or more IR absorbers from the group of tungstates.

Suitable inorganic IR absorbers from the group of borides include for example compounds of the type $M_xB_y$ (M=La, Ce, Pr, Nd, Tb, Dy, Ho, Y, Sm, Eu, Er, Tm, Yb, Lu, Sr, Ti, Zr, Hf, V, Ta, Cr, Mo, W and Ca; and x and y are integers from 1 to 6) such as lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride (CrB and $CrB_2$), molybdenum boride ($MoB_2$, $Mo_2B_5$ and MoB), tungsten boride ($W_2B_5$) or combinations thereof.

Suitable inorganic IR absorbers from the group of tungstates also include for example those from the group of tungsten compounds of the type $W_yO_z$ (W=tungsten, O=oxygen; z/y=2.20-2.99) and/or $M_xW_yO_z$ (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0), wherein elements preferred as M are H, Cs, Rb, K, Tl, In, Ba, Li, Ca, Sr, Fe and Sn, among which very particular preference is given to Cs. Particular preference is given to $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$ and mixtures thereof. In a particular embodiment of the present invention, the sole use of $Cs_{0.33}WO_3$ as inorganic IR absorber is very particularly preferred. Likewise preferred are Cs/W ratios of 0.20 and 0.25.

Among the inorganic IR absorbers the tungstates are preferable over the borides on account of their low inherent coloration provided that the process according to the invention is to be carried out on plastic parts having a radiation permeability of ≥10% to ≤99%, preferably of ≥30% to ≤95%, particularly preferably ≥40% to ≤93%, for the chosen radiation determined by the UV-VIS-NIR-MIR method according to DIN EN ISO/IEC 17025.

To prepare such tungstates tungsten trioxide, tungsten dioxide, a hydrate of a tungsten oxide, tungsten hexachloride, ammonium tungstate or tungstic acid for example and optionally further salts containing the element M, for example cesium carbonate, are mixed in certain stoichiometric ratios so that the molar ratios of the individual components are given by the formula $M_xW_yO_z$. This mixture is subsequently treated in a reducing atmosphere, for example an argon-hydrogen atmosphere, at temperatures between 100° C. and 850° C. and finally the obtained powder is heat-treated in an inert gas atmosphere at temperatures between 550° C. and 1200° C. To produce the inorganic IR absorber nanoparticles according to the invention the IR absorber may be mixed with the dispersants described hereinbelow and further organic solvents, for example toluene, benzene or similar aromatic hydrocarbons, and ground in suitable mills, for example ball mills, with addition of zirconium oxide (for example having a diameter of 0.3 mm) to produce the desired particle size distribution. The nanoparticles are obtained in the form of a dispersion. After grinding, it is optionally possible to add further dispersants. The solvent is removed at elevated temperatures and reduced pressure. Preference is given to nanoparticles having an average size smaller than 200 nm, particularly preferably smaller than 100 nm. The size of the particles can be determined with the aid of transmission electron microscopy (TEM). Measurements of this kind on IR absorber nanoparticles are described, for example, in Adachi et al., J. Am. Ceram. Soc. 2008, 91, 2897-2902.

Production of the tungstates according to the invention is more particularly described for example in EP-A 1 801 815 and said tungstates are commercially available for example from Sumitomo Metal Mining Co., Ltd. (Japan) under the designation YMDS 874.

For example for use in plastic parts (A) comprising transparent thermoplastics having a radiation permeability for the selected radiation of ≥10% to ≤99%, preferably of ≥30% to ≤95%, particularly preferably ≥40% to ≤93%, determined according to the UV-VIS-NIR-MIR method according to DIN EN ISO/IEC 17025, the thus obtained particles are dispersed in an organic matrix, for example in an acrylate, and optionally ground as described hereinabove in a mill using suitable auxiliaries, for example zirconium dioxide, and optionally using organic solvents, for example toluene, benzene or similar hydrocarbons.

Suitable polymer-based dispersants are in particular dispersants having a high transmission, for example polyacrylates, polyurethanes, polyethers, polyesters or polyesterurethanes and polymers derived therefrom.

Preferred dispersants are polyacrylates, polyethers and polyester-based polymers, and particularly preferred dispersants of high thermal stability are polyacrylates, for example polymethylmethacrylate, and polyesters. It is also possible to use mixtures of these polymers or else copolymers based on acrylate. Dispersing auxiliaries of this kind and methods for production of tungstate dispersions are described, for example, in JP 2008214596 and in Adachi et al. J. Am. Ceram. Soc. 2007, 90 4059-4061. Suitable dispersants are commercially available.

Polyacrylate-based dispersants are suitable in particular. Such suitable dispersants are obtainable for example from Ciba Specialty Chemicals under the trade names EFKA™, for example EFKA™ 4500 and EFKA™ 4530. Polyester-containing dispersants are likewise suitable. They are obtainable for example from Avecia under the trade name Solsperse™, for example Solsperse™ 22000, 24000 SC, 26000, 27000. Polyether-containing dispersants are also known for example under the trade names Disparlon™ DA234 and DA325 of Kusumoto Chemicals. Polyurethane-based systems are also suitable. Polyurethane-based systems are obtainable from Ciba Specialty Chemicals under the trade name EFKA™ 4046, EFKA™ 4047. Texaphor™ P60 and P63 are corresponding trade names of Cognis The amount of the IR absorber in the dispersant may be 0.2% by weight to 50.0% by weight, preferably 1.0%-40.0% by weight, more preferably 5.0%-35.0% by weight and most preferably 10.0%-30.0% by weight based on the dispersion of the inorganic IR absorber employed according to the invention. The overall composition of the ready-to-use IR absorber formulation may include not only the pure IR absorber material and the dispersant but also further auxiliaries such as for example zirconium dioxide, and residual solvents, for example toluene, benzene or similar aromatic hydrocarbons.

There are no limitations whatsoever to the amount of the inorganic IR absorbers according to the invention, particularly preferably those from the group of tungstates, in the polymer compositions of the plastic parts. However, the inorganic IR absorbers, in particular the tungstates, may typically be employed in an amount of ≥0.7% by weight to ≤4.5% by weight, preferably ≥0.6% by weight to ≤2% by weight and particularly preferably ≥0.7% by weight to ≤1.5% by weight calculated as the solids fraction of inorganic IR absorber in the total polymer composition.

In the present context the term solids fraction of inorganic IR absorber, in particular tungstate, is to be understood as meaning the inorganic IR absorber, in particular the tungstate, as a pure substance and not as a dispersion, suspension or other preparation containing the pure substance, wherein the contents of IR additive, in particular the tungstate content, reported below also always relate to this solids fraction unless explicitly otherwise stated.

In a further embodiment further IR absorbers may optionally be employed in addition to the tungstates as IR absorbers, although the proportion/amount thereof in such a mixture is always below that of the above-described tungstates. In the case of mixtures, preference is given to compositions containing two to five (inclusive) and particularly preferably two or three different IR absorbers. The further IR absorber is preferably selected from the group of borides and tin oxides, and particularly preferably contains $LaB_6$ or antimony-doped tin oxide or indium tin oxide.

Such mixtures of IR absorbers predominantly occur in applications where intrinsic coloring of the component up to a Delta E of 20, preferably up to a Delta E of 15, relative to the plastic part without IR absorbers is acceptable.

In an alternative embodiment of the invention the plastic part may be coated with an additive in the form of a coating composition which has an absorption maximum in the wavelength range of the employed focused nonionizing electromagnetic radiation. These coating compositions preferably comprise an IR absorber which absorb in the wavelength range from ≥0.70 μm to ≤1000 μm, preferably in the range from ≥1.0 μm to ≤50 μm, particularly preferably in the range from ≥1.0 μm to ≤2.5 μm. These coating compositions are commercially available for example as Clearweld™ under the designation LD920, LD930 or LD940.

The at least one additive which has an absorption maximum in the wavelength range of the employed focused nonionizing electromagnetic radiation may be in the plastic part.

The coloring bath (B) may comprise at least one colorant, preferably at least one dye, particularly preferably at least one dye from the group of solvent dyes and/or disperse dyes according to the Colour Index classification or mixtures of these dyes.

The Colour Index (CI) of the Society of Dyers and Colourists and the American Association of Textile Chemists and Colorists unambiguously characterizes all colorants via the group name and the number for the chemical composition/chemical structure.

Dyes from the group of solvent dyes according to the Colour Index classification may be for example the so-called Macrolex™ dyes from Lanxess AG, Germany. Examples include Macrolex™ Blue 3R, Macrolex™ Red H, Macrolex™ Yellow 6G (Solvent Yellow 179 according to CI), Macrolex™ Violet Red R (Disperse Violet 31 according to CI), Macrolex™ Orange R (Solvent Orange 107 according to CI) or mixtures of these dyes.

Dyes from the group of the disperse dyes according to the Colour Index classification may be for example diazo-, diphenylamine and anthraquinone compounds, acetate dyes, dispersion dyes and/or dispersol dyes and include disperse blue #3, disperse blue #14, disperse yellow #3, disperse red #134 and disperse red #7. The classification and description of the abovementioned dyes are in accordance with "The Colour Index", 3rd edition, joint publication of the Society of Dyes and Colors and the American Association of Textile Chemists and Colorists (1971). Very generally the dyes may be employed either as a single dye constituent or as a component of a mixture according to the desired color. Thus the employed term "dye" also encompasses dye mixtures.

Suitable dyes include water-insoluble diazo-diphenylamine and anthraquinone compounds. Particularly suitable are acetate dyes, dispersed acetate dyes, dispersion dyes and dispersol dyes, as disclosed in the Colour Index, $3^{rd}$ edition, volume 2, The Society of Dyers and Colourists, 1971, p. 2479 and 2187-2743.

The preferred dispersed dyes include Dystar's Palanil Blue E-R150 (anthraquinone/disperse blue), DIANIX Orange E-3RN (azo dye/C1 disperse-Orange 25) and the abovementioned Macrolex™ dyes as solvent dyes.

In one embodiment the coloring bath comprises:
a) solvent and/or dispersant, preferably water and/or organic solvent, particularly preferably water
b) colorant, preferably a dye, particularly preferably a dye from the solvent dyes and/or disperse dyes according to the Colour Index classification.

Coloring baths of this kind suitable for uniform coloring of polycarbonate plastic parts at temperatures >80° C. have proven advantageous. These are described for example in WO-A 03/040461, EP-A 2050866, WO-A 03/083207. Under the conditions of the process according to the invention a partial coloring of the plastic part takes place substantially at the irradiated regions so that an intensive engraving becomes visible precisely at these sites.

In a further embodiment of the invention the coloring bath therefore comprises in addition to the abovementioned components a) and b)
c) at least one further solvent of structural formula (IV)

   (IV), in which R is an ethyl, propyl or butyl radical,
m is 2, 3 or 4 and
n is 1, 2 or 3,
with the proviso that when R is butyl, m is 2 or 4,
d) at least one leveling agent of structural formula (V):

   (V), in which m is 2, 3 or 4 and
n is 1, 2 or 3.

The components a) to d) may be present in the following amounts based on the total weight of the coloring bath:
a) 50.0% to 99.99% by weight, preferably 62.5% to 90.0% by weight, particularly preferably 65.0% to 85.0% by weight,
b) 0.01% to 15.0% by weight, preferably 0.1% to 5.0% by weight, particularly preferably 0.2% to 4.0% by weight,
c) 0% to 35.0% by weight, preferably 1.0% to 30.0% by weight, particularly preferably 5.0% to 25.0% by weight,
d) 0% to 30.0% by weight, preferably 1.0% to 20.0% by weight, particularly preferably 3.0% to 15.0% by weight.

The components a) to d) are preferably present in the coloring bath in the following amounts based on the total weight of the coloring bath:
a) 50.0% to 99.99% by weight, preferably 62.5% to 90.0% by weight, particularly preferably 65.0% to 85.0% by weight,
b) 0.01% to 25% by weight, preferably 0.1% to 20% by weight, particularly preferably 0.2% to 18% by weight,
c) 0% to 35.0% by weight, preferably 1.0% to 30.0% by weight, particularly preferably 5.0% to 25.0% by weight,
d) 0% to 30.0% by weight, preferably 1.0% to 20.0% by weight, particularly preferably 3.0% to 15.0% by weight.

In a further embodiment of the process according to the invention the coloring bath comprises a dye and/or a dye mixture selected from the group of the disperse dyes according to the Colour Index classification, very particularly a dye selected from the group consisting of azo-, diphenylamine and anthraquinone compounds.

In another preferred embodiment of the process according to the invention the coloring bath comprises a dye and/or a dye mixture from the group of the solvent dyes according to the Colour Index classification, very particularly preferably a dye and/or dye mixture of the Makrolex™ dyes.

The solvent and/or dispersant a) employed may be water and/or organic solvent. It is preferred to employ water.

Suitable organic solvents include any commonly used solvents that do not attack the plastic part on contact. Examples include butyl alcohol, butylene glycol, diethylene glycol, ethyl alcohol, ethylene glycol, heptane, hexane, pentane, propargyl alcohol, propyl alcohol or mixtures of the abovementioned solvents.

It is preferable to employ water and c) in the process according to the invention.

The irradiation of the plastic part (A) in step ii) is carried out with focused nonionizing electromagnetic radiation, wherein the wavelength range of the focused nonionizing electromagnetic radiation is chosen such that the coloring bath has a radiation permeability of ≥2% to ≤99%, preferably of ≥30% to ≤95%, particularly preferably of ≥40% to ≤93%, for the chosen radiation determined by the UV-VIS-NIR-MIR method according to DIN EN ISO/IEC 17025.

In an advantageous embodiment of the invention the irradiation in step ii) is carried out with laser radiation with a wavelength in the range from ≥0.1 μm to ≤1000 μm, preferably from ≥1.0 μm to ≤50 μm, particularly preferably from ≥1.0 μm to ≤2.5 μm.

Provided that the irradiation is carried out with the laser it may be carried out in continuous wave operation (CW laser). It is particularly preferable to employ pulsed laser radiation for the irradiation of the plastic parts. A pulse duration of the laser of fractions of seconds is sufficient to achieve a coloring of the plastic part at the laser-irradiated sites. It is preferable to employ pulse durations of $10^{-18}$ to $10^{-1}$ seconds, particularly preferably pulse durations of $10^{-9}$ to $10^{-2}$ seconds, very particularly preferably pulse durations of $10^{-6}$ to $10^{-3}$ seconds.

Varying the power of the employed laser beam for the irradiation in step ii) makes it possible to influence the intensity of the coloring at the lasered sites according to the requirements of the desired application. The higher the employed laser power, the more intensive the coloring at the lasered sites of the plastic part. The intermediate power range of a 7.5 watt marking laser achieves color engravings of sufficient quality. Significantly higher powers and thus also more intensive colorings in the plastic part can be achieved in pulsed operation.

Varying the frequency of the employed laser beam for the irradiation in step ii) makes it possible to control whether a carbonization of the plastic surface, and thus production of gray or black engravings, is to be effected or whether the engraving is to be effected in color, for example blue, magenta, yellow. The process according to the invention preferably employs NdYAG lasers (neodymium-doped yttrium-aluminum-garnet lasers) to engrave plastic parts made of polycarbonate. A pulse frequency of up to 25 kHz may still be used to achieve engravings in a gray color in plastic parts made of polycarbonate. At higher frequencies (>25 kHz) and thus lower energy densities the energy of the laser is no longer sufficient to achieve black or gray colorings but engraving in blue, magenta, yellow may still be effected at these energy densities.

It is preferable to employ NdYAG lasers (neodymium-doped yttrium-aluminum-garnet lasers) in the process according to the invention. The shorter the pulses, the higher the peak pulse power. At pulse durations of 15 ns to 400 ns pulse peaks of 100 kJ are achievable. However, color laser engraving of plastic parts may also be carried out using laser types such as are suitable for engraving and welding of plastics. It is thus also possible to employ a $CO_2$ laser for example. This may preferably be used to effect engraving in blue, magenta, yellow.

The color concentration of the coloring bath may also influence the intensity of the partial coloring of the plastic part after irradiation. Preference is given to a concentration of colorant, preferably dye, of 0.01% to 25% by weight, preferably 0.1% to 20% by weight, particularly preferably 0.2% to 18% by weight, based on the total weight of the coloring bath.

One embodiment of the process according to the invention employs a molding made of plastic which is produced in an injection molding apparatus according to known processes such as for example in-mold decoration (IMD), film insert molding (FIM) or high pressure forming (HPF).

In a further embodiment of the process according to the invention the plastic part is a layer construction containing at least one layer of a thermoplastic plastic selected from polymers of ethylenically unsaturated monomers and/or polycondensates of bifunctional reactive compounds, preferably one or more polycarbonate(s) or copolycarbonate(s) based on diphenols, poly- or copolyacrylate(s) and poly- or copolymethacrylate(s), poly- or copolymer(s) of styrene, polyurethane(s) and polyolefin(s), poly- or copolycondensate(s) of terephthalic acid, poly- or copolycondensate(s) of naphthalenedicarboxylic acid, poly- or copolycondensate(s) of at least one cycloalkyldicarboxylic acid, or mixtures thereof, particularly preferably one or more polycarbonate(s) or copolycarbonate(s) based on diphenols or blends containing at least one polycarbonate or copolycarbonate.

It is very particularly preferable when the at least one layer containing at least one thermoplastic plastic is a film. It is preferable when this film has a layer thickness of ≥1 μm to ≤1000 μm, preferably ≥5 to ≤800 μm, very particularly preferably ≥10 to ≤500 μm.

For the avoidance of repetition, the following will refer to the abovementioned descriptions of the thermoplastic plastic in respect of preferred embodiments, material, composition and additives.

In a further embodiment the layer construction comprises at least one layer containing at least one thermoplastic plastic as described hereinabove and at least one further layer containing at least one thermoplastic plastic as described hereinabove and at least one laser-sensitive additive, preferably black pigment, particularly preferably carbon black. Such layer constructions are known for example from WO-A 2010/089035 and are suitable for laser engraving in black-and-white, especially for personalized laser engraving of security documents and, very particularly, of identification documents.

In another embodiment of the layer construction according to the invention at least one layer containing at least one thermoplastic plastic may further comprise at least one filler. The filler is preferably at least one color pigment and/or at least one other filler for producing a translucence of the filled layers, particularly preferably a white pigment, very particularly preferably titanium dioxide, zirconium dioxide or barium sulfate and in a preferred embodiment titanium dioxide.

The filling of a layer containing at least one thermoplastic plastic with at least one such filler improves the visibility of the incorporated script/image(s), thus also further improving the perception of improved sharpness and resolution. This layer construction is known from WO-A 2010/089035 and is described in detail therein.

In a further embodiment of the layer construction according to the invention the layer construction may comprise at least one layer of a thermoplastic plastic at least one additive which has an absorption maximum in the wavelength range of the employed focused nonionizing electromagnetic radiation and wherein this at least one layer of a thermoplastic plastic has a radiation permeability of ≥10% to ≤99%, preferably of ≥30% to ≤95%, particularly preferably ≥40% to ≤93%, for the chosen radiation determined by the UV-VIS-NIR-MIR method according to DIN EN ISO/IEC 17025, preferably an inorganic IR absorber, particularly preferably an inorganic IR absorber from the group of tungstates. This layer preferably forms an outer layer of the layer construction which is ultimately also color laser engraved.

In a further embodiment of the layer construction according to the invention this at least one outer layer comprises a thermoplastic plastic containing at least one additive which has an absorption maximum in the wavelength range of the employed focused nonionizing electromagnetic radiation and wherein this at least one layer of a thermoplastic plastic has a radiation permeability of ≥10% to ≤99%, preferably of ≥30% to ≤95%, particularly preferably ≥40% to ≤93%, for the chosen radiation determined by the UV-VIS-NIR-MIR method according to DIN EN ISO/IEC 17025, preferably an inorganic IR absorber, particularly preferably an inorganic IR absorber from the group of tungstates, and a further layer containing at least one thermoplastic plastic and at least one laser-sensitive additive, preferably black pigment, particularly preferably carbon black, and optionally a further layer of a thermoplastic plastic comprising a filler, preferably a white pigment, particularly preferably titanium dioxide, zirconium dioxide or barium sulfate, very particularly preferably titanium dioxide.

This embodiment makes it possible for example to combine the color laser engraving according to the invention with black laser engraving. To this end the plastic part (A) comprising the above-described layer construction may be irradiated with C) as in step ii) in the absence of the coloring bath (B) either before step i) and/or after step ii). The same radiation (C) may ideally be employed for this further irradiation. The irradiation with (C) in the absence of the coloring bath (B) makes it possible to apply a black engraving onto the surface, preferably in transparent and/or white layers of the layer construction arranged therebelow, at the desired site. In the case of laser engraving outside the coloring bath the high laser reactivity of these layer constructions results in a blackening at the laser-irradiated sites. If the layer construction is in the coloring bath the intensity of the laser beam is reduced by the coloring bath in such a way that coloring is effected only at the irradiated sites but no blackening of the surface of the layer construction is brought about.

As an alternative to the coloring bath the partial coloring of the plastic part (A) may also be effected by means of a coloring layer b) containing at least one colorant which is produced in a first step i').

The application accordingly further provides an alternative process for partial coloring, in particular color laser engraving, of plastic parts, preferably of thermoplastic plastic parts, very particularly preferably of thermoplastic plastic parts comprising a layer construction, comprising at least the steps of:

i') producing a coloring layer b) on at least a partial area of plastic part (A);

ii') irradiating the plastic part (A) from i') with nonionizing electromagnetic radiation (C), wherein the partial coloring is effected substantially only at the sites covered with the color layer b) in step i') or at the sites irradiated in step ii'), wherein the wavelength range of the nonionizing electromagnetic radiation (C) is chosen such that the coloring layer b) has a radiation permeability of ≥0.1% to ≤99%, preferably of ≥0.5% to ≤95%, particularly preferably ≥0.9% to ≤93%, for the chosen radiation determined by the UV-VIS-NIR-MIR method according to DIN EN ISO/IEC 17025. Before, during or after the irradiation in step ii) the plastic part (A) has a temperature in a range from ≤99° C. to ≥−60° C., preferably from ≤70° C. to ≥−40° C., particularly preferably from ≤50° C. to ≥−15° C., wherein the temperature of the plastic part (A) can vary in a temperature range of 100° C. over the duration of the process. The coloring layer b) preferably has a thickness of 0.001 mm to 10 mm, particularly preferably of 0.005 mm to 5 mm, very particularly preferably of 0.01 mm to 1 mm. The focused nonionizing electromagnetic radiation (C) preferably passes through a sheet (D) comprising one or more radiation-decoupling materials before it impacts the plastic part (A).

It is preferable when the nonionizing electromagnetic radiation (C) is laser radiation having a wavelength in the range from ≥0.1 µm to ≤1000 µm, preferably in the range from ≥1.0 µm to ≤50 µm, particularly preferably in the range from ≥1.0 µm to ≤2.5 µm.

In step i') of the alternative process the coloring layer b) is preferably applied to the plastic part (A) as a solid or a liquid layer, so that the plastic part (A) is at least partially wetted with the coloring layer b). A solid layer may be produced by drying the coloring layer b) applied as a liquid. To apply a liquid layer to the plastic part (A) it is preferable to employ a process selected from the group consisting of spraying, coating, pouring, immersing and printing, such as ink jet, screen printing, offset printing, intaglio printing, doctor coating, intaglio printing, pad printing or a combination of at least two of these. In this alternative process the partial coloring is achieved by applying colorant in the form of the color layer b) only at particular sites of the plastic part (A). The irradiating in step ii') may be effected on a partial-area or whole-area basis depending on whether the colorant was applied to the whole area or a partial area of the plastic part (A). Thus, in the event that the colorant is in step i') applied as the at least partial-area color layer b) on a whole-area basis, the irradiating in step ii') is carried out on a partial-area basis. In the event that the colorant is applied to the plastic part (A) as the at least partial-area color layer b) on a partial basis, the irradiating in step ii') may also be carried out on a whole-area basis. The colorant and its composition have already been described in connection with the first process according to the invention.

In the case of whole-area application of the coloring layer b) to the plastic part (A) in step i') and partial irradiating in step ii'), the unirradiated portion of the coloring layer b) is preferably removed after step ii'). The removal of the coloring layer b) may be effected for example in a water bath, assisted by ultrasonic cleaning, or with the assistance of mechanical cleaning means such as sponges, brushes, which may also be driven by a motor (rotation, oscillation, vibration, etc.).

The preferred ranges and embodiments for (A) to (E) described hereinabove in connection with the process according to the invention also apply to the alternative process, and are equally applicable thereto, when present. Reference is therefore made to the above to avoid repetition.

The color concentration of the coloring layer may also influence the intensity of the partial coloring of the plastic part after irradiation. The coloring layer b) preferably has a concentration of colorant, preferably dye, of 0.01% to 98% by weight, preferably of 0.1% to 50% by weight, particularly preferably of 0.2% to 25% by weight, based on the total weight of the coloring layer b).

The color layer thickness is preferably precisely adjusted over the entire process and is preferably kept constant over the duration of the entire process to achieve a partial coloring of high intensity and sharpness. The color layer thickness is preferably 0.001 mm to 10 mm, particularly preferably 0.005 mm to 5 mm, very particularly preferably 0.01 mm to 1 mm.

The invention further provides plastic articles, in particular security and/or high-value documents, very particularly identification documents, obtainable by the process according to the invention. In particular the security documents personalized/color engraved by the process according to the invention feature high forgery security of the applied personalized/color engraved information. The process according to the invention allows color personalization of blank documents in a decentralized and forgery-secure manner. It is moreover possible to provide tactile laser engraving in color rather than only in black as was previously the case.

Plastic articles, in particular security and/or high-value documents, very particularly identification documents may also be obtainable by the alternative process according to the invention. These documents also feature high forgery security of the applied personalized/color engraved information.

The invention further provides an apparatus comprising a coloring bath (B), a sheet (D) comprising one or more radiation-decoupling materials and a radiation source (E) for producing focused nonionizing electromagnetic radiation (C), characterized in that the coloring bath (B) has a temperature of ≤99° C. to ≥−60° C., preferably of 99° C. to 0° C., more preferably of ≤70° C. to ≥10° C., particularly preferably of ≤50° C. to ≥15° C., wherein the temperature preferably remains constant upon startup of the apparatus and in that the focused nonionizing electromagnetic radiation (C) passes through the sheet (D) comprising one or more radiation-decoupling materials before impacting the plastic part (A). In a preferred embodiment of the apparatus the temperature may vary in a temperature range of 100° C., preferably of 80° C., particularly preferably of 50° C., more preferably of 30° C., yet more preferably of 20° C., over the duration of the process. If the temperature varies by not more than 10° C. it is regarded as a constant temperature.

The above-described preferred ranges and embodiments for (A) to (E) also apply to the apparatus. Reference is therefore made to the above to avoid repetition.

FIG. 1 shows a possible embodiment of the apparatus according to the invention for the partial coloring of two-dimensional plastic parts.

Figure 2:
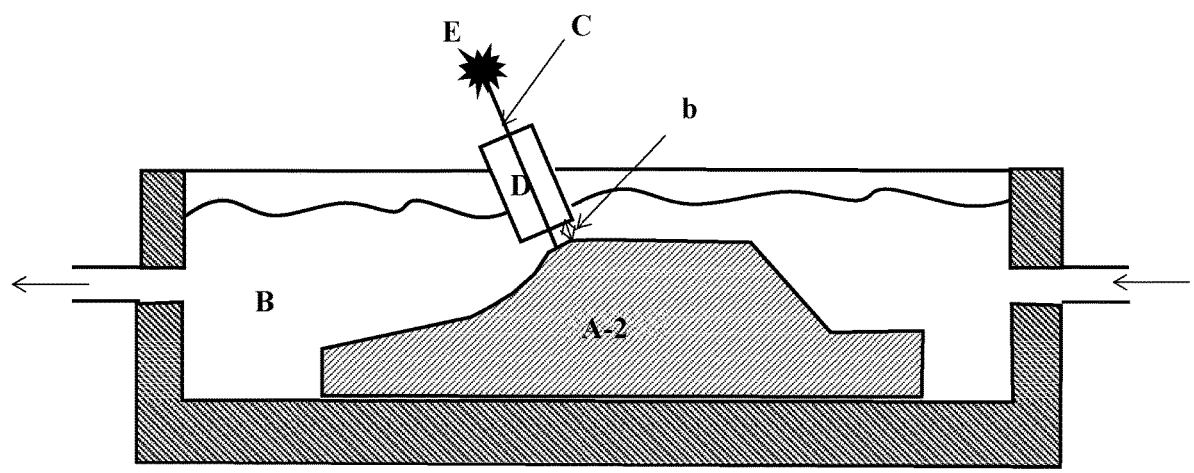
FIG. 2 shows a possible embodiment of the apparatus according to the invention for the partial coloring of three-dimensional plastic parts.

FIG. 2 shows a possible embodiment of the apparatus according to the invention for the partial coloring of three-dimensional plastic parts.

The reference numerals in FIGS. 1 and 2 are as follows:
A-1: Two-dimensional plastic part, preferably thermoplastic plastic part, particularly preferably thermoplastic plastic part comprising a layer construction
A-2: Three-dimensional plastic part, preferably thermoplastic three-dimensional plastic part
B: Coloring bath or coloring layer in liquid form
C: Focused nonionizing electromagnetic radiation
D: Sheet comprising one or more radiation-decoupling materials
E: Radiation source for producing focused nonionizing electromagnetic radiation
b: Immersion depth or color layer thickness FIG. 1 shows a schematic diagram of a coloring bath B into which a two-dimensional plastic part A-1 is immersed such that at least one of its surfaces contacts the colorant present in the coloring bath B. Arranged above the surface of the two-dimensional plastic part A-1 arranged in the coloring bath B at a well-defined distance b, also known as immersion depth or the color layer thickness, is a sheet D comprising one or more radiation-decoupling materials. During the process according to the invention a radiation source for producing focused nonionizing electromagnetic radiation E is used to direct focused nonionizing electromagnetic radiation C onto the surface of the plastic part A-1 in order to undertake partial coloring of the plastic part A-1. The coloring bath B may have a discharge and a feed for the colorant, thus allowing continuous introduction of fresh colorant into the coloring bath B in order for example to maintain the coloring bath B at a substantially constant temperature. The radiation source E may be arranged movably in at least two dimensions with respect to the plastic part A-1 and the sheet D so that different regions on the surface of the plastic part A-1 may be irradiated.

In the alternative process according to the invention the sheet D is optional and the coloring bath B may be in contact with the plastic part A-1 in such a way that only parts of the surface of the plastic part A-1 are covered with colorant.

FIG. 2 shows a schematic diagram of an arrangement with a coloring bath B as shown in FIG. 1 which is suitable for irradiating a three-dimensional plastic part A-2. In contrast to the arrangement in FIG. 1, both the radiation source E and the sheet D are arranged movably with respect to the surface of the plastic part A-2 so that the radiation source E together with the sheet D are movable in three dimensions relative to the plastic part A-2, thus making it possible to undertake engraving on the three-dimensional plastic part A-2.

EXAMPLES

Film 1: Makrofol™ ID4-4 opaque white made of polycarbonate in a thickness of 300 μm from Covestro Deutschland AG.
Film 2: Transparent polycarbonate film comprising IR absorber in a thickness of 100 μm was produced as follows:
Masterbatch: Compounding of a Highly Concentrated IR Masterbatch The production of the masterbatch for the production of the film 2 was carried out with a conventional twin-screw compounding extruder (ZSK 32) at processing temperatures customary for polycarbonate of 250° C. to 330° C.

A master batch having the following composition was compounded and subsequently granulated:

94.69% by weight of polycarbonate Makrolon™ 3108 from Covestro Deutschland AG 0.75% by weight of YMDS 874 IR absorber from Sumitomo
4.5% by weight of Makrolon™ 3108 powder from Covestro Deutschland AG
0.006% by weight (60 ppm) lamp black 101 (carbon black from Evonik-Degussa GmbH) having an average particle size of 95 nm Production of Extrusion Film 2

The employed apparatus for producing the extruded film comprises:
- an extruder for extrusion of the layer containing at least one polycarbonate with a screw of 60 mm in diameter (D) and a length of 33 D. The screw has a degassing zone;
- a melt pump;
- a crosshead;
- a slot die of 450 mm in width;
- a three-roller smoothing calendar with horizontal roller orientation, wherein the third roller can swivel by +/−45° relative to the horizontal;
- a roller conveyor;
- thickness measuring means;
- means for double-sided application of protective film;
- a haul-off;
- a winding station.

The granulate of the masterbatch was conveyed from the dryer into the filling hopper of the extruder. The material was melted and conveyed in the barrel/screw plasticizing system of the extruder. The melt passed from the slot die onto the smoothing calendar. The final shaping and cooling of the film was carried out on the smoothing calendar (consisting of three rollers). The surfaces were embossed using a textured steel roller (no. 6 side) and a textured silicone rubber roller (no. 2 side). The rubber roller used for texturing the film surface is disclosed in US-4 368 240 from Nauta Roll Corporation. The film was subsequently transported through a haul-off and then the film was wound up.

Lamination of Films 1 and 2 to Afford Laminate A and A':

Lamination was carried out on a Bürckle 50/100 lamination press. Films 1 and 2 were laminated with the following press settings:
Preheating the press to 170-180° C.
Pressing for 8 minutes at a pressure of 15 N/cm²
Pressing for 2 minutes at a pressure of 100 N/cm²
Cooling the press to 38° C. and opening the press.

Composition of Coloring Bath for Examples 1 and 2

69.31% by weight of water
0.99% by weight of Macrolex™ Blue 3R (dye, from Lanxess AG Deutschland)
19.8% by weight of ethylene glycol butyl ether (EGBE), (solvent, The Dow Chemical Company)
9.9% by weight of diethylene glycol (DEG), (leveling agent, Merck KGaA)

Composition of Coloring Solution for Producing Coloring Layer

30% by weight of water
20% by weight of Macrolex™ Blue 3R (dye, from Lanxess AG Deutschland)
50% by weight of isopropanol.

Example 1 (Comparative)

The laminate A was placed (transparent side (film 2) facing upward) in the coloring bath (B) of the abovementioned composition.

Laser irradiation was carried out using a Foba D84 NdYAG laser having a laser power of about 7.5 W, a laser frequency of 8 kHz in pulsed operation and a current of 30 A. The advance rate of the laser, the immersion depth and the temperature of the coloring bath (B) are reported in table 1.

The coloring bath comprising the film was placed on the workpiece carrier of a Foba D84S laser apparatus. The laser (E) was focused onto the film surface. The immersion depth is reported in table 1. In the context of the present invention immersion depth is to be understood as meaning the penetration depth of the employed radiation into the coloring bath up to the surface of the plastic part onto which the partial coloring is to be applied. Irradiation with the laser beam was commenced.

TABLE 1

| Conditions of the color laser engraving | |
| --- | --- |
| Temperature of coloring bath | 40° C. |
| Immersion depth | 1 mm |
| Advance rate | 100 mm/s |

After irradiation with the laser (E) the laminate A was withdrawn from the coloring bath and the quality of the laser engraving was subjected to visual assessment. The engraving was nonuniform in terms of color intensity and sharpness of the engraved image.

Example 2 (Inventive—According to the Process According to Claim 1 (Laminate A) and According to the Alternative Process (Laminate A'))

The laminate A (A-1) was placed (transparent side (film 2) facing upward) in the coloring bath (B) of the abovementioned composition. The laminate A' was coated with a coloring layer by printing.

A glass sheet (D) made of silicate glass having a thickness of 3 mm was placed on the laminate A. Spacers were used to establish a distance of 1 mm (immersion depth) between the laminate A and the glass sheet (D). The coloring bath (B) was filled such that the top of the glass sheet (B) could remain free of coloring liquid.

The laminate A' was clamped in a holder.

Laser irradiation was carried out using a Foba D84 NdYAG laser having a laser power of about 7.5 W and a laser frequency of 8 kHz for laminate A and 30 kHz for laminate A' in pulsed operation and a current of 30 A. The advance rate of the laser, the immersion depth/color layer thickness (b) and the temperature of the coloring bath (B) are reported in table 2.

The laser (E) was focused through the glass sheet onto the film surface of laminate A'. In the context of the present invention immersion depth/color layer thickness (b) is to be understood as meaning the penetration depth of the employed radiation into the coloring bath (B)/into the coloring layer b) up to the surface of the plastic part onto which the partial coloring is to be applied. Irradiation with the laser beam was commenced.

TABLE 2

| Conditions of the color laser engraving | |
| --- | --- |
| Temperature of the coloring bath for laminate A/the coloring layer for laminate A' | 40° C. |

TABLE 2-continued

Conditions of the color laser engraving

| | |
|---|---|
| Immersion depth/color layer thickness | 1 mm or 0.3 mm defined by the distance between the laminate and the glass sheet or the thickness of the coloring layer |
| Advance rate in process according to claim 1 or according to alternative processes | 100 or 50 mm/s |

After the irradiation with the laser the laminate A was removed from the coloring bath (B) or the unirradiated color layer was removed from laminate A' in a water bath with the aid of a sponge. The quality of the laser engraving was subsequently subjected to visual inspection. Compared to example 1 the engraving of both laminate A and laminate A' was markedly more uniform in terms of color intensity and sharpness of the engraved image.

The invention claimed is:

1. A process for partial coloring of plastic parts, comprising
    i) immersing a plastic part (A) in a coloring bath (B); and
    ii) irradiating the plastic part (A) from i) with focused nonionizing electromagnetic radiation (C),
    wherein partial coloring of the plastic part (A) is effected substantially only at sites irradiated in step ii),
    wherein a wavelength range of the focused nonionizing electromagnetic radiation (C) is chosen such that the coloring bath (B) has a radiation permeability of ≥2% to ≤99% for a chosen radiation determined by the UV-VIS-NIR-MIR method according to DIN EN ISO/IEC 17025, wherein
    the coloring bath (B) has a temperature of ≤99° C. to ≥−60° C., wherein the temperature of the coloring bath (B) has a constant temperature over the duration of the process, wherein the focused nonionizing electromagnetic radiation (C) passes through a sheet (D) comprising one or more radiation-decoupling materials before impacting the plastic part (A), and wherein a distance of the sheet (D) from a surface of the plastic part (A) is ≤120 mm.

2. The process according to claim 1, wherein the focused nonionizing electromagnetic radiation (C) is laser radiation having a wavelength in the range from ≥0.1 µm to ≤1000 µm.

3. The process according to claim 1, wherein the radiation-decoupling material(s) of the sheet (D) exhibit(s) a scratch-dig value of ≤80-50 to ≤10-10 determined according to ISO10110-8, a surface roughness Rq determined according to ISO 10110-8 of ≥0.5 to ≤500 nm, and a radiation permeability of ≥50% to ≤99.95% for the chosen radiation determined according to the UV-VIS-NIR-MIR method according to DIN EN ISO/IEC 17025.

4. The process according to claim 1, wherein the radiation-decoupling material(s) of the sheet (D) comprise(s) glass, radiation-permeable plastic, mineral glass, synthetic glass, radiation-permeable ceramic material, or mixtures of at least two thereof.

5. The process according to claim 1, wherein the plastic part (A) comprises a thermoplastic plastic comprising polymers of ethylenically unsaturated monomers, polycondensates of bifunctional reactive compounds, polyaddition products of bifunctional reactive compounds, or a combination thereof.

6. The process according to claim 1, wherein the plastic part (A) comprises at least one additive which has an absorption maximum in a wavelength range of the employed focused nonionizing electromagnetic radiation or wherein the plastic part is coated with at least one additive in the form of a coating composition which has an absorption maximum in a wavelength range of the employed focused nonionizing electromagnetic radiation.

7. The process according to claim 6, wherein the at least one additive comprises at least one or more organic and/or inorganic IR absorbers.

8. The process according to claim 1, wherein the coloring bath (B) comprises at least one colorant, or mixtures thereof.

9. The process according to claim 1, wherein the coloring bath (B) comprises at least one dye comprising solvent dyes and/or disperse dyes according to the Colour Index classification or mixtures of these dyes.

10. The process according to claim 1, wherein the coloring bath (B) comprises:
    a) solvent and/or dispersant, and
    b) at least one colorant.

11. A security document, comprising a plastic part (A) that is at least partially colored according to the process for partial coloring of plastic parts of claim 1.

* * * * *